(12) United States Patent
Brownjohn et al.

(10) Patent No.: US 8,616,501 B2
(45) Date of Patent: Dec. 31, 2013

(54) PRE-INSTALLED ADAPTABLE SUPPLY NETWORK FOR AEROPLANES

(75) Inventors: Nicholas Brownjohn, Buxtehude (DE); Stefan Osternack, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 91 days.

(21) Appl. No.: 13/163,527

(22) Filed: Jun. 17, 2011

(65) Prior Publication Data
US 2012/0175464 A1    Jul. 12, 2012

Related U.S. Application Data

(63) Continuation of application No. PCT/EP2009/066948, filed on Dec. 11, 2009.

(60) Provisional application No. 61/138,229, filed on Dec. 17, 2008.

(30) Foreign Application Priority Data

Dec. 17, 2008 (DE) .......................... 10 2008 062 700

(51) Int. Cl.
*B64C 1/06* (2006.01)

(52) U.S. Cl.
USPC .......................................................... 244/131

(58) Field of Classification Search
USPC ................................................. 244/131, 119
See application file for complete search history.

(56) References Cited

U.S. PATENT DOCUMENTS 5,423,498 A * 6/1995 Fluegel ..................... 244/117 A
6,035,084 A * 3/2000 Haake et al. .................... 385/49
(Continued)

FOREIGN PATENT DOCUMENTS

DE            3531028 A1    3/1987
DE       102006050534 A1    4/2008
(Continued)

OTHER PUBLICATIONS

International Search Report dated Mar. 15, 2011 for International Application No. PCT/EP2009/066948.
(Continued)

*Primary Examiner* — Tien Dinh
*Assistant Examiner* — Justin Benedik
(74) *Attorney, Agent, or Firm* — Ingrassia Fisher & Lorenz, P.C.

(57) ABSTRACT

An aircraft structure is provided that includes, but is not limited to structural elements, a first multitude of lines that are in a fixed manner connected to structural elements, a second multitude of lines that are in a fixed manner connected to structural elements and whose longitudinal direction intersects the longitudinal direction of the first multitude of lines so that the longitudinal directions of the lines form a network that covers the aircraft structure at least in some sections, and connecting elements in order to, in the state of the structural elements installed in the aircraft structure, connect selected lines of the first multitude to selected lines of the second multitude of selected points of intersection of the network in order to in this way form transmission lines, such as lines for electricity transmission and/or data transmission. Furthermore, a method is provided for manufacturing such an aircraft structure.

15 Claims, 8 Drawing Sheets

(56) References Cited

U.S. PATENT DOCUMENTS

| | | |
|---|---|---|
| 6,280,100 B1 | 8/2001 | Haake |
| 6,302,593 B1 | 10/2001 | Haake |
| 6,930,820 B1 | 8/2005 | Shooks, Jr. et al. |
| 6,963,687 B2 | 11/2005 | Vergeest et al. |
| 7,039,276 B2* | 5/2006 | Aldridge et al. ............... 385/39 |
| 7,047,349 B2* | 5/2006 | Carpenter .................... 710/316 |
| 7,281,318 B2* | 10/2007 | Marshall et al. .............. 29/621 |
| 2003/0080251 A1* | 5/2003 | Anast ........................... 244/119 |
| 2006/0049311 A1* | 3/2006 | Callahan et al. ........... 244/118.6 |
| 2008/0185478 A1* | 8/2008 | Dannenberg ................ 244/119 |
| 2010/0156196 A1 | 6/2010 | Boss et al. |

FOREIGN PATENT DOCUMENTS

| | | |
|---|---|---|
| EP | 1677091 A1 | 7/2006 |
| EP | 1962123 A1 | 8/2008 |
| WO | 0167160 A2 | 9/2001 |
| WO | 02081307 A1 | 10/2002 |
| WO | 2004003612 A1 | 1/2004 |
| WO | 2007063145 A1 | 6/2007 |
| WO | 2010028006 A2 | 3/2010 |

OTHER PUBLICATIONS

Sjögren, Anders, Manufacturing Technique for Embedding Detachable Fiber-Optic Connections in Aircraft Composite Components, Smart Mater. Struct., 2000, pp. 855-858, vol. 9, Publishing Ltd, United Kingdom.

German Office Action dated Jul. 28, 2009 for German Application No. 10 2005 062 700.3.

International Searching Authority, International Search Report for Application No. PCT/EP2009/066948, dated Mar. 24, 2011.

* cited by examiner

PRE-INSTALLED ADAPTABLE SUPPLY NETWORK FOR AEROPLANES

CROSS-REFERENCE TO RELATED APPLICATIONS

This application is a continuation of International Application No. PCT/EP2009/066948, filed Dec. 11, 2009, which was published under PCT Article 21(2) and which claims priority to German Patent Application No. 102008062700.3 filed Dec. 17, 2008 and of U.S. Provisional Patent Application No. 61/138,229 filed Dec. 17, 2008, the disclosure of which applications is hereby incorporated herein by reference.

TECHNICAL FIELD

The invention relates to an aircraft structure comprising a line network and to a method for its manufacture.

BACKGROUND

Hitherto-used cabling in aircraft for connecting aircraft system components necessitates very considerable planning and manufacturing expenditure. Already at the time of configuring the aircraft the cable routing needs to be determined, wherein, in particular, space requirements play an important role. Changing the arrangement of system components requires expensive adaptation of the associated cabling. Furthermore, measures must be taken to space cables away from the aircraft structure so as to prevent any chafing or even severing of cables, which could otherwise result in short circuits and in the loss of system functions.

It is the object of the invention to solve at least some of the problems associated with the cabling of aircraft.

SUMMARY

According to an exemplary embodiment of the invention, an aircraft structure is provided comprising structural elements; a first multitude of lines that are in a fixed manner, in other words non-detachably, preferably irreversibly, connected to structural elements; a second multitude of lines that are in a fixed manner, in other words non-detachably, preferably irreversibly, connected to structural elements, and whose longitudinal direction intersects the longitudinal direction of the first multitude of lines, so that the longitudinal directions of the lines form a network that spans the aircraft structure at least in some sections; and connecting elements in order to, at selected points of intersection of the network, in the state of the structural elements installed in the aircraft structure, connect selected lines of the first multitude to selected lines of the second multitude, and in this way form lines for electricity transmission and/or data transmission.

The invention aims to replace the hitherto-used standard electrical cabling of an aircraft structure, in particular of an aircraft fuselage, by a structure-spanning adaptable network of lines, preferably optical fibers. In this arrangement the aircraft structure is used to carry the data connections and/or electricity connections, which become integral parts of the aircraft structure. The network or grid comprising lines, which network or grid has been pre-installed in this manner, thus provides a connection option for various systems. A particular line route is implemented in that an axially extending line (e.g. in a longitudinal frame element) is connected to a line (e.g., in a transverse frame element or in a transverse member) that extends across the aforesaid. Each structural element, for example a longitudinal frame element, transverse frame element or transverse member, can carry a multitude of lines with little, or even without any, increase in weight when compared to the bare aircraft fuselage structure. By means of this concept the remaining installation effort during the integration of systems is limited to the last centimeters or meters between the access point to the line network and the interface of the system to be selected or controlled. The remaining cabling (by means of electrical or optical connections) is thus limited to short connections between the line network and the final system equipment according to the particular customer requirements.

As a result of the aircraft structure presently described, a large number of possible connecting routes are pre-installed with the smallest possible increase in weight or with almost no increase in weight. If optical lines are embedded in the structural elements, almost no increase in weight results. If electrical lines are connected to the structural elements, this results in a slight increase in weight when compared to the line-free structural elements, wherein, however, very considerable weight savings can be achieved when compared to hitherto used cabling comprising cable harnesses and associated mounting supports.

The pre-installed network of lines makes it possible to extensively relocate or move system components without the need to disturb or redefine the complete connection infrastructure. Furthermore, cables, corresponding cable harnesses, mounting clips, mounting supports and cable ties etc. can be done without, which results in enormous savings in weight. Furthermore, as a result of the embedded lines it is possible to provide for much tighter radii, should a change in direction be required. Moreover, this network offers system engineers a large number of free connecting routes that can simply be selected for the installation of new system components, without the need to define a new line and install it in the aircraft structure. Thus, in each aircraft program a great deal of time can be saved in the definition and implementation of connecting routes.

According to a further advantageous exemplary embodiment, a method for manufacturing an aircraft structure is provided, by means of which method it is also possible to achieve the above-mentioned advantages.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
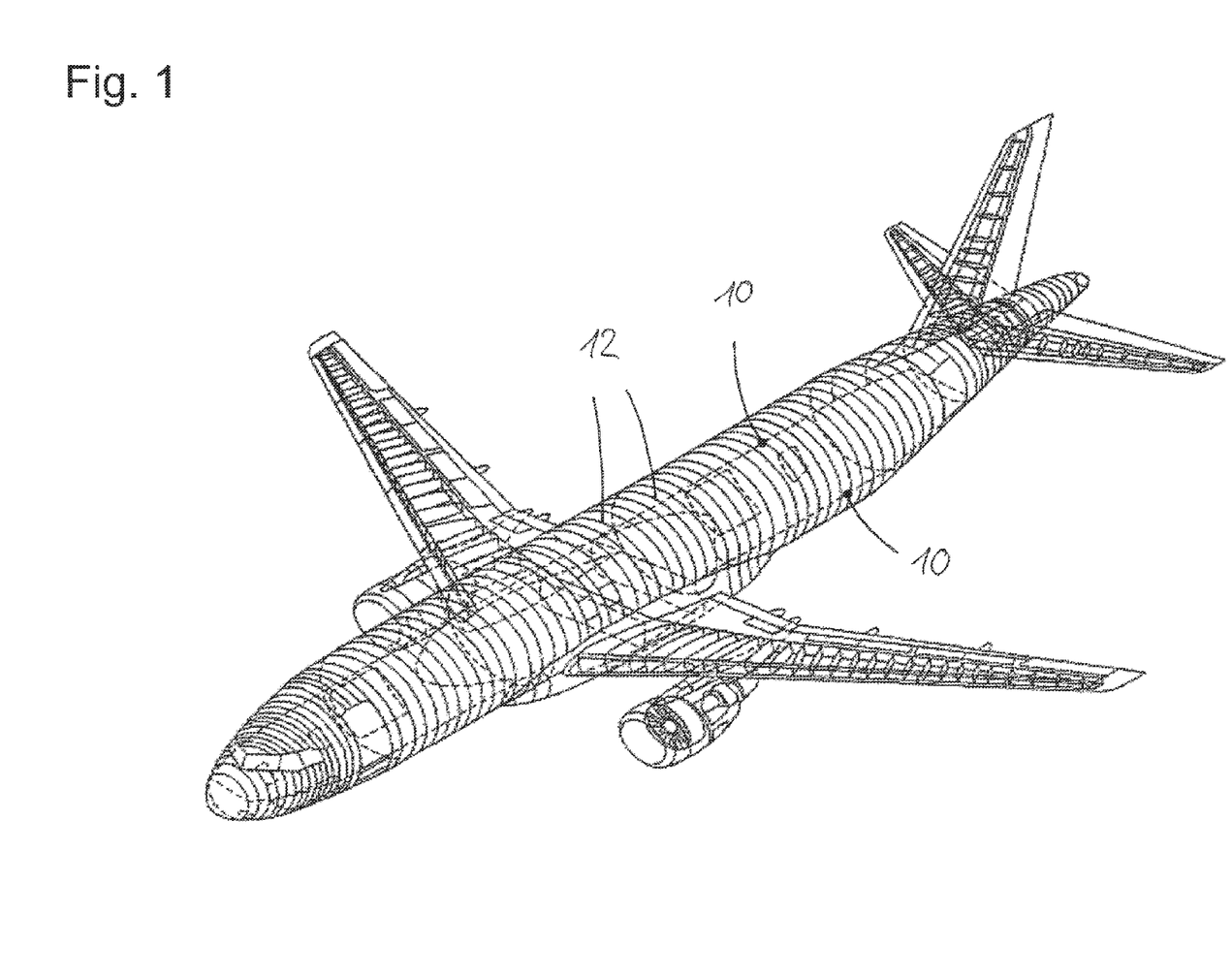
FIG. 1 shows an aircraft in which a few primary structure elements are shown.

FIG. 1 shows an aircraft in which a few primary structure elements are shown. The structural elements, which extend in longitudinal direction of the aircraft and are designated 10, are referred to as longitudinal frame elements. The arc-shaped structural elements that extend across the aforesaid and essentially define the exterior shape of the fuselage cross section are referred to as transverse frame elements 12, while the structural elements that extend across the longitudinal direction of the aircraft and horizontally (relative to the aircraft situated on the ground) are referred to as transverse braces, on which, for example, the cabin floor or a cargo compartment floor can be installed.

Figure 2:
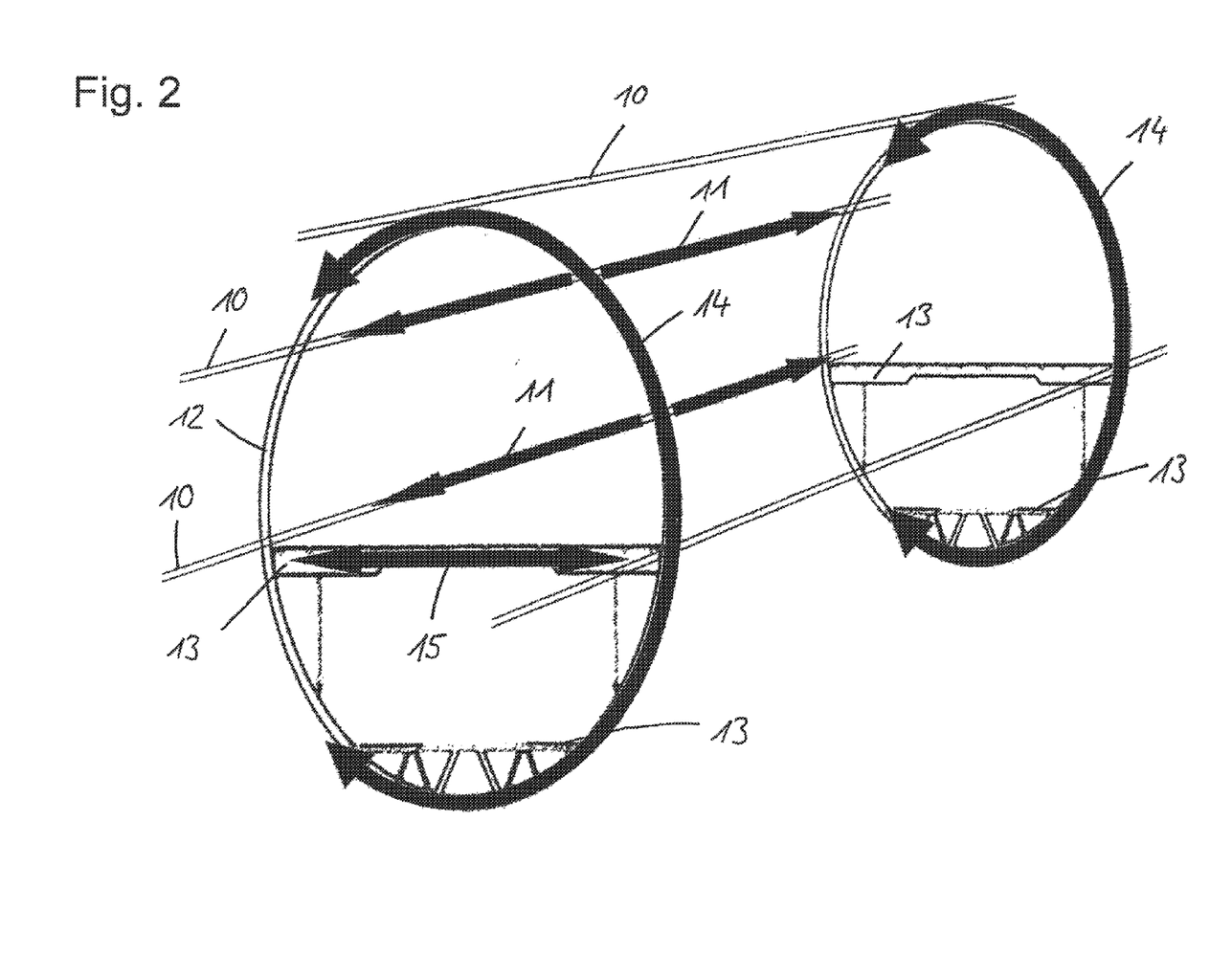
FIG. 2 diagrammatically shows a line arrangement according to an exemplary embodiment of the invention.

FIG. 2 diagrammatically shows a line arrangement according to an exemplary embodiment of the invention. Usually in aircraft construction some longitudinal frame elements 10 extend parallel to each other in longitudinal direction of the aircraft. A first multitude of lines 11 are connected to these longitudinal frame elements 10. Across the longitudinal direction of the aircraft the transverse frame elements 12 extend, which define the cross-sectional shape of the aircraft fuselage. In this arrangement, the oval fuselage cross section shown in FIG. 2 comprises several transverse frame elements 12 that are interconnected on the face side. The transverse frame elements 12 are connected to the longitudinal frame elements 10 in such a manner that a grid structure is formed. Moreover, transverse braces 13 extend across the longitudinal direction of the aircraft and horizontally. A second multitude of lines are borne by these transverse frame elements 12 and/or by the transverse braces 13, wherein the lines borne by the transverse frame elements 12 comprise the reference character 14 and the lines borne by the transverse braces 13 comprise the reference character 15. The structural elements can be made from metal, metal-matrix composite materials, or composite materials such as, for example, carbon-reinforced or optical-fiber-reinforced epoxy resins. The lines, 11, 14, 15 are embedded in the respective longitudinal frame elements 10, transverse frame elements 12 or transverse braces 13, or are arranged on the aforesaid. Each individual one of these structural elements 10, 12, 13 can comprise one or several individual lines and/or one or several line bundles that belong together, preferably in the form of ribbon lines (e.g. 12 to 96 optical lines that extend parallel to each other).

In the case of metallic structural elements the lines can preferably be applied to the surface of the structural elements by means of adhesive bonding, spraying on (in the case of an electrical line), vapor deposition (in the case of an electrical line), embedding in an applied paint layer or lacquer layer, or by placing the line between the structural element and an exterior skin applied thereto. If metal-matrix composite materials are used, the lines could also be applied to the surface, while in the case of optical lines they could also be embedded in the metal matrix, for example by them being laid in the fiber reinforcement.

If composite materials have been used in the manufacture of the structural elements, such an application to the surface of the structural elements can also take place, and/or the lines are embedded in the structural elements. Such embedding can take place during manufacture of the structural element by means of interweaving or laying into the fiber reinforcement, by laminating or by laying them in the resin. The lines that have been integrated in this manner in the structural elements thus become an integral part of the structural elements. In this manner the lines contribute in a multifunctional manner both to the stability of the structural element and to data distribution or current distribution.

The lines 11, 14, 15 are preferably optical lines or optical waveguides, in particular optical fiber lines; however, as an alternative or in addition to the optical lines it is also possible to provide electrical lines, in particular copper wires or copper conducting paths. The optical lines are used for data transmission, whereas the electrical lines are preferably used for electricity transmission in the low-power region. In the connection of the electrical lines to the structural elements, additionally, corresponding insulation of said electrical lines from the surroundings and from the structural material (e.g. the metal or the carbon fibers) must be provided, which insulation can, for example, be implemented by corresponding sheathing (e.g., high-temperature polyamide) of the electrical lines.

Figure 3:
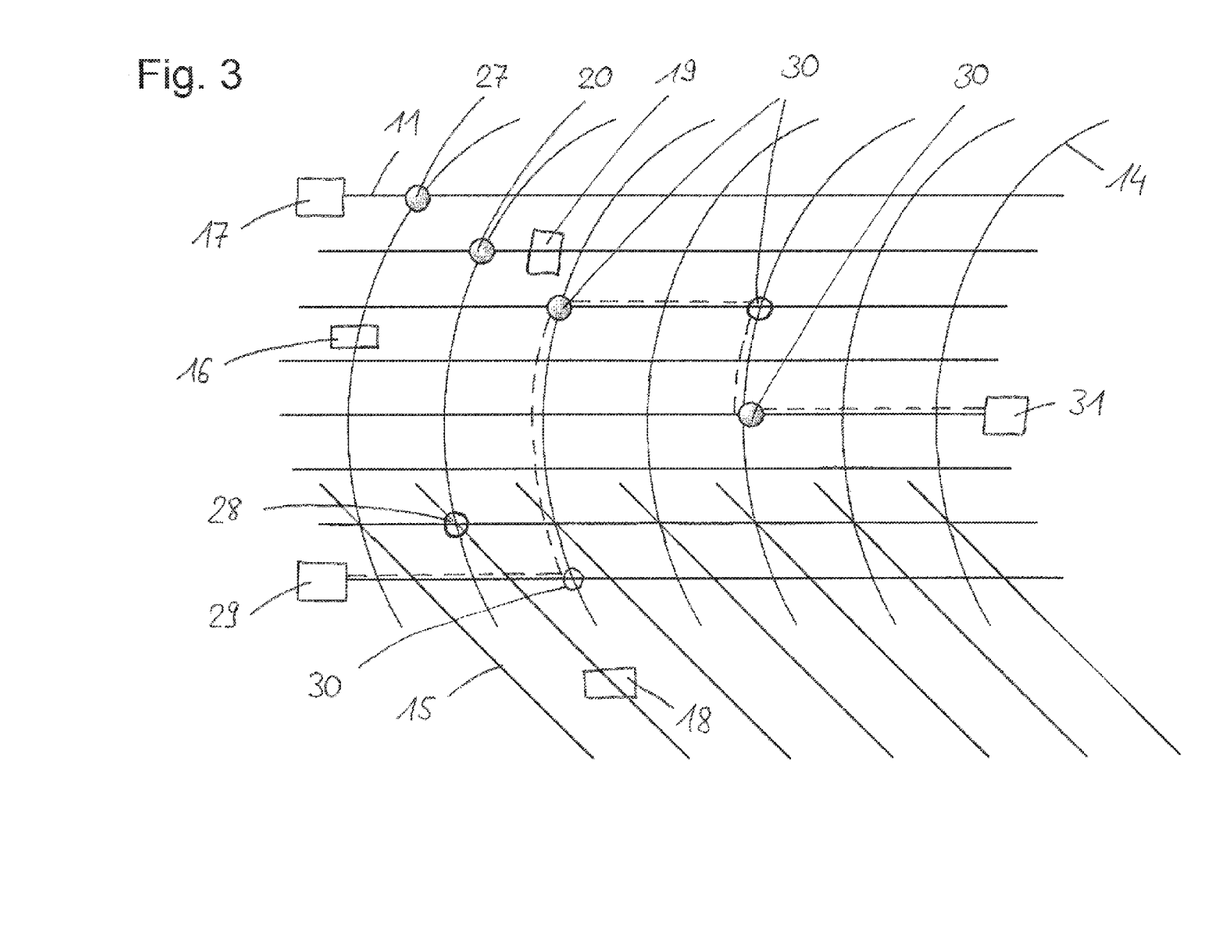
FIG. 3 diagrammatically shows the resulting network of lines.

FIG. 3 diagrammatically shows the resulting network of lines. For the sake of clarity, this illustration shows the reference characters 11, 14 and 15 only once while in each case characterizing an entire group of the respective parallel-extending lines. The lines 11, 14 and 15, which extend along the longitudinal frame elements 10, the transverse frame elements 12 and the transverse braces 13 in the installed state of the structural elements, form a network with points of intersection as shown in FIG. 3. In this context the points of intersection are not to be interpreted as the lines actually touching at these locations, but instead imaginary lines along the longitudinal direction of the lines 11, 14, 15 in the top view corresponding to FIG. 2 result in points of intersection. At the points of intersection of the network formed in this manner there is at first no optical/electrical connection. In order to produce such a connection, the lines 11, 14 and 15 are connected to connecting elements that will be explained in more detail below. For example, if a system component 16, which is connected to the left-hand side (in relation to the presentation in the figure) of the multitude of lines 14 is to be connected to a system component (e.g. a control unit) 17, which system component is connected to the uppermost of the multitude of lines 11, then a connection is to be made at the point of intersection 27. The line section of this uppermost line from the multitude of lines 11, which is situated to the right-hand side of the point of intersection 27, can be cut off to the right-hand side of the point of intersection 27 and this cut-off line section can be re-used for other system component connections. Likewise, a system component 18 which is connected to the second line from the left-hand side from the multitude of lines 15 can be connected to a system component 19 which is connected to the second one from the top from the multitude of lines 11 in that at a point of intersection 20 this line 11 is connected to a line 14, and the latter is connected at a further point of intersection 28 to the line 15 associated with the system component 18. Although already mentioned, it should be pointed out again that although in this document for the sake of simplicity the lines are designated in the singular, in practical application the term "line" can refer to one or several individual lines and/or to one or several line bundles that belong together. In this manner after assembly of the structural elements to form an aircraft structure, for example an aircraft fuselage, each position of this aircraft structure can be reached by way of a line, in that at a suitable point of intersection a connection is produced. In a flexible manner it is thus possible to achieve any imaginable zigzag route in order to bypass regions or for reasons connected with redundancy through the aircraft structure. For example, as shown in FIG. 3, a system component 29 can be connected to a system component 31 by way of establishing connections at several points of intersection 30 along a route that is dashed in the drawing. For each longitudinal frame element, transverse frame element or transverse member preferably twelve or more lines are provided, which results in several millions of possible routes for connecting system components. Generally-speaking, a pre-installed adaptable network of pre-installed lines in an aircraft structure is thus realized.

Figure 4:
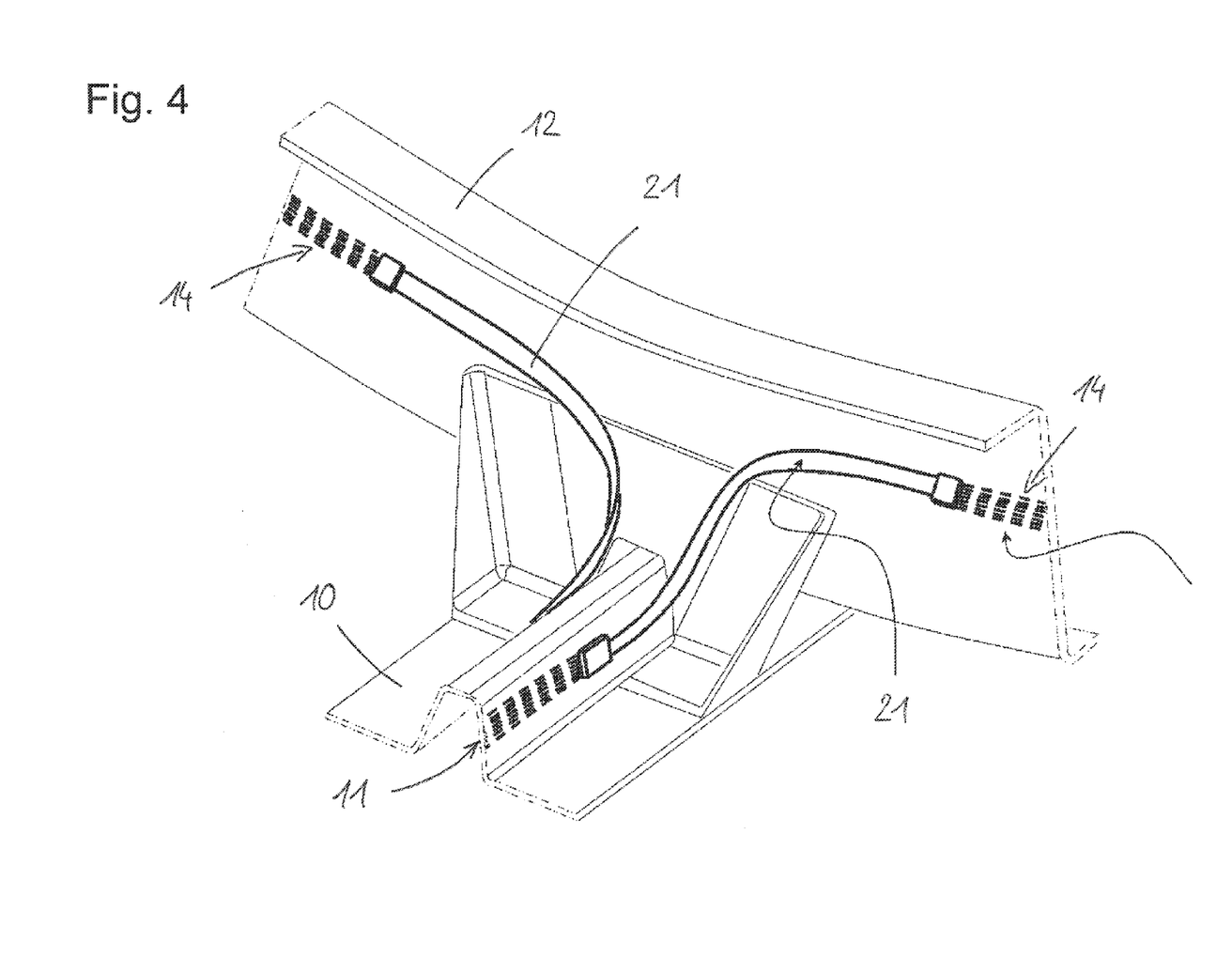
FIG. 4 shows a specific embodiment of the connection of lines.

FIG. 4 shows a specific design of the connection of lines. As shown in the figure, the longitudinal frame element 10 comprises a web that extends in longitudinal direction of the longitudinal frame element 10, with a bundle of optical fiber lines 11 being embedded in the flanks of said web. The longitudinal frame element 10 intersects a transverse frame element 12 in which, departing from the point of intersection in opposite direction, a bundle of optical fiber lines 14 is embedded. In order to interconnect the optical fiber lines 11 and 14, two connecting elements 21 are provided, which are preferably flexible, optical foils with 12 to 96 optical fibers that extend parallel to each other. In the exemplary embodiment shown in FIG. 4, in each case one of the two bundles of optical fibers 11 provided on/in the longitudinal frame element 10 is connected to one of the two bundles of optical fibers 14 provided in the transverse frame element 12. According to the illustration, in this arrangement the connection between several optical fiber lines that extend parallel to each other is established by means of the connecting element 21. As an alternative it is also possible for the connecting element 21 to be designed in such a manner that in each case only a single, or only a few, optical fibers of the bundle of optical fibers 11 is/are connected to a corresponding number of optical fibers from the bundle of optical fibers 14. Connecting the ends of the connecting element 21 to the embedded optical fibers takes place in such a manner that the embedded optical fiber is tapped by means of an access hole, and that the light guided by said optical fiber is deflected to the ends and is forwarded by said ends. A particular form of such connections is known from the state of the art, for example from U.S. Pat. No. 7,039,276 B2. By attaching/embedding the optical fibers to/in the flanks of the web of the longitudinal frame element 10 it becomes possible to separate the line routing for critical systems in longitudinal direction of the aircraft. As a result of the continuation of the lines 14 in opposite directions on the transverse frame element 12 this safe parting is also implemented on the transverse frame element 12. This parting can be implemented in all the structural elements 10, 12, 13 by attaching the lines 11, 14, 15 to sides facing in opposite directions.

In order to avoid repetition, in the description of the following figures only those aspects are explained that differ from the description so far.

Figure 5:
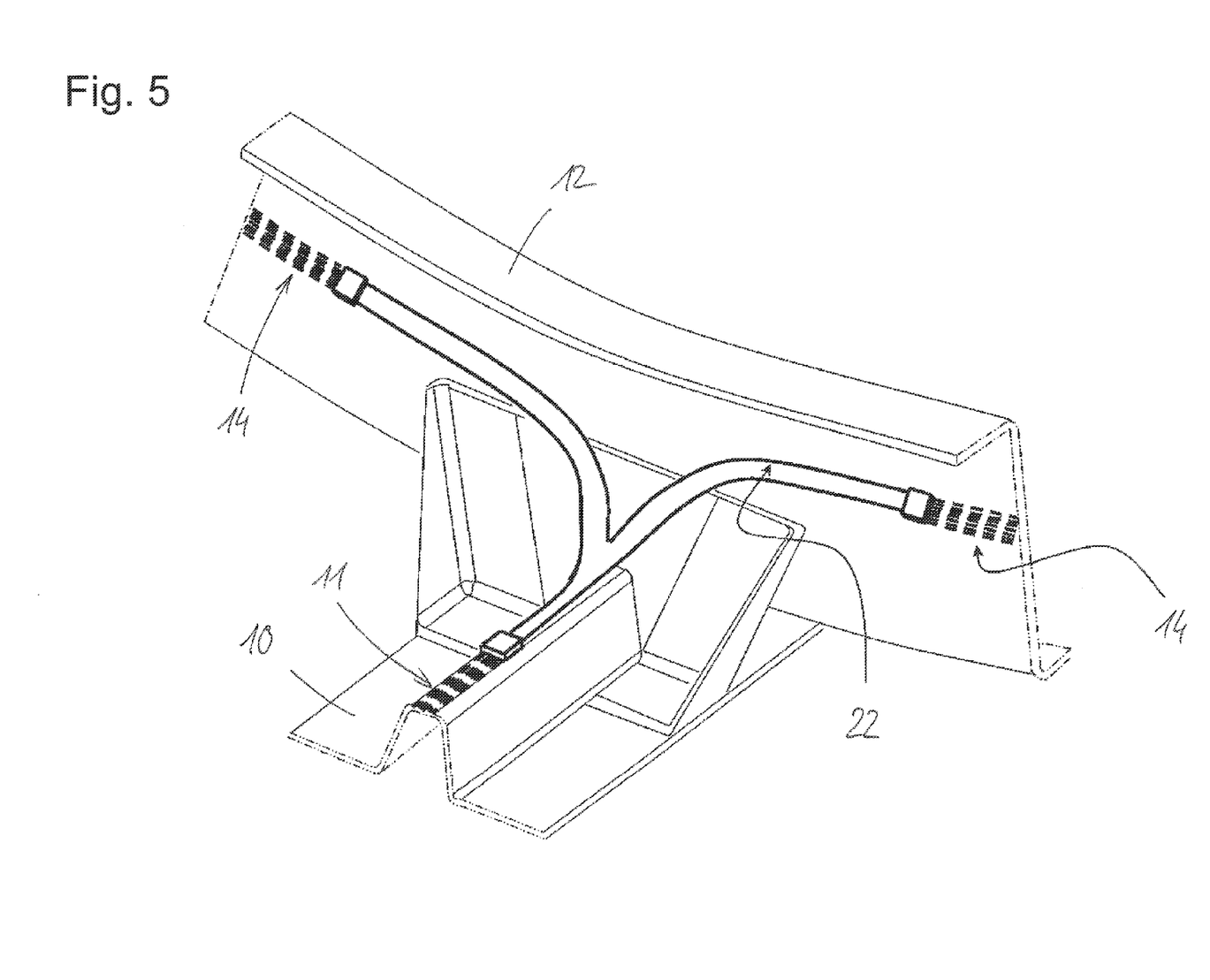
FIG. 5 shows a further specific embodiment of the connection of lines.

FIG. 5 shows a further specific embodiment of the connection of lines. In this embodiment the longitudinal frame element 10 comprises a bundle of optical fiber lines 11 which are embedded in the region of the top of the web. A connecting element 22 is Y-shaped, connecting part of the optical fibers from the bundle of optical fibers 11 to the bundle of optical fibers 14 that on the transverse frame element 12 extend in one direction, and connecting the other part to the bundle of optical fibers 14 that extend in the opposite direction to the aforesaid.

Figure 6:
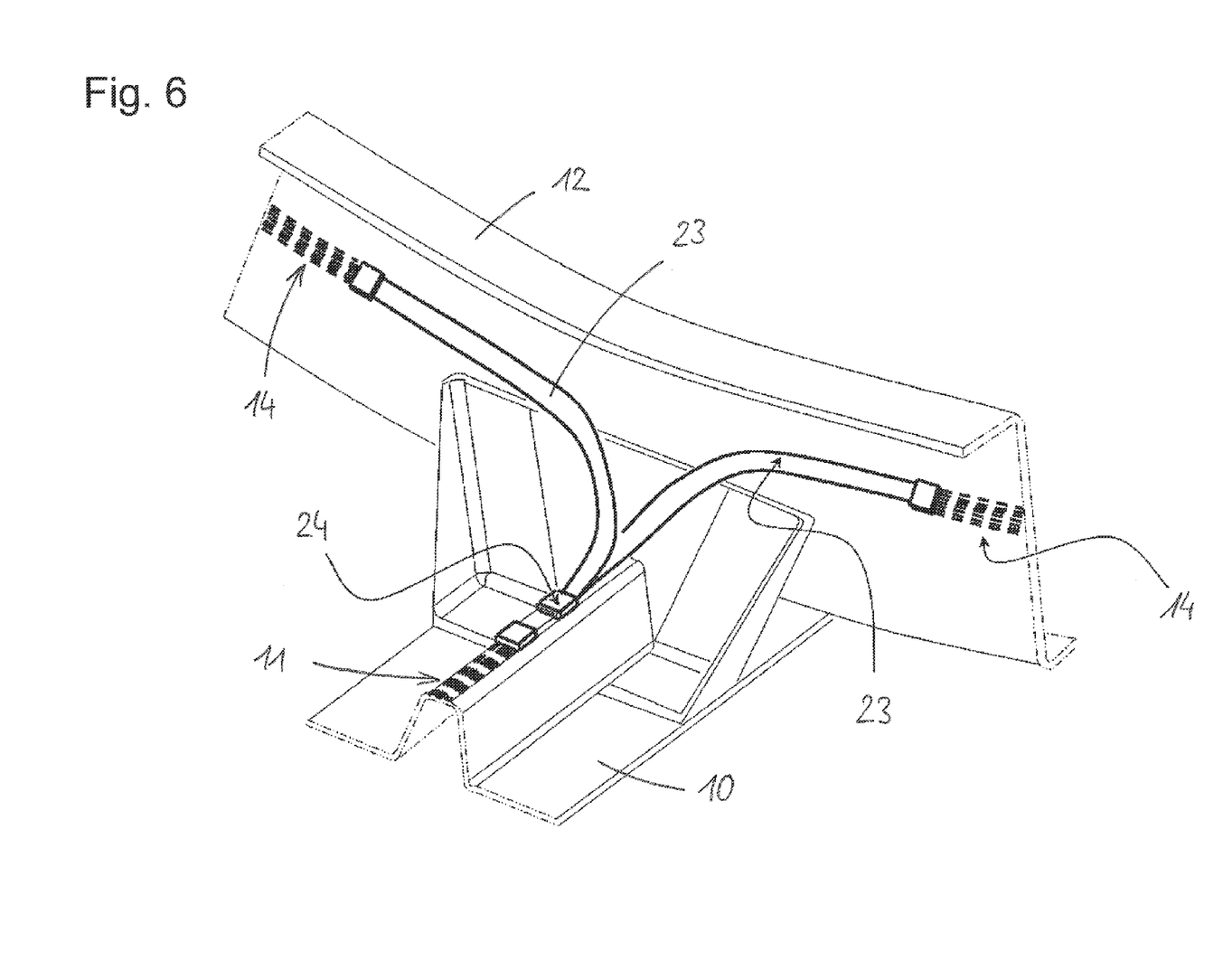
FIG. 6 shows a further specific embodiment of the connection of lines.

FIG. 6 shows a further specific embodiment of the connection of lines. In this embodiment the longitudinal frame element 10 comprises a bundle of optical fiber lines 11 that are embedded in the region of the top of the web. A connecting element 23 is also Y-shaped, in each case connecting a single optical fiber from the bundle of optical fibers 11 to an optical fiber comprising the two bundles of optical fibers 14 of the transverse frame element 21. In this arrangement, splitting an optical fiber connection into two optical fiber connections takes place by means of a power splitter 24 that is known from the state of the art. This provides an advantage in that splitting the optical fiber lines 11 that act as supply lines in each case into two ongoing optical fiber lines 14 results in increased redundancy in the case of damage. For example, tire damage or propeller damage could result in detached parts that are thrown against the aircraft severing one of the optical fiber lines 14. In such a case the separately routed optical fiber line 14, which leads in the opposite direction to the system component, would then still be intact. Thus by means of a deliberate selection of routes it can be ensured that redundancy is provided even if a line were to be interrupted.

Figure 7:
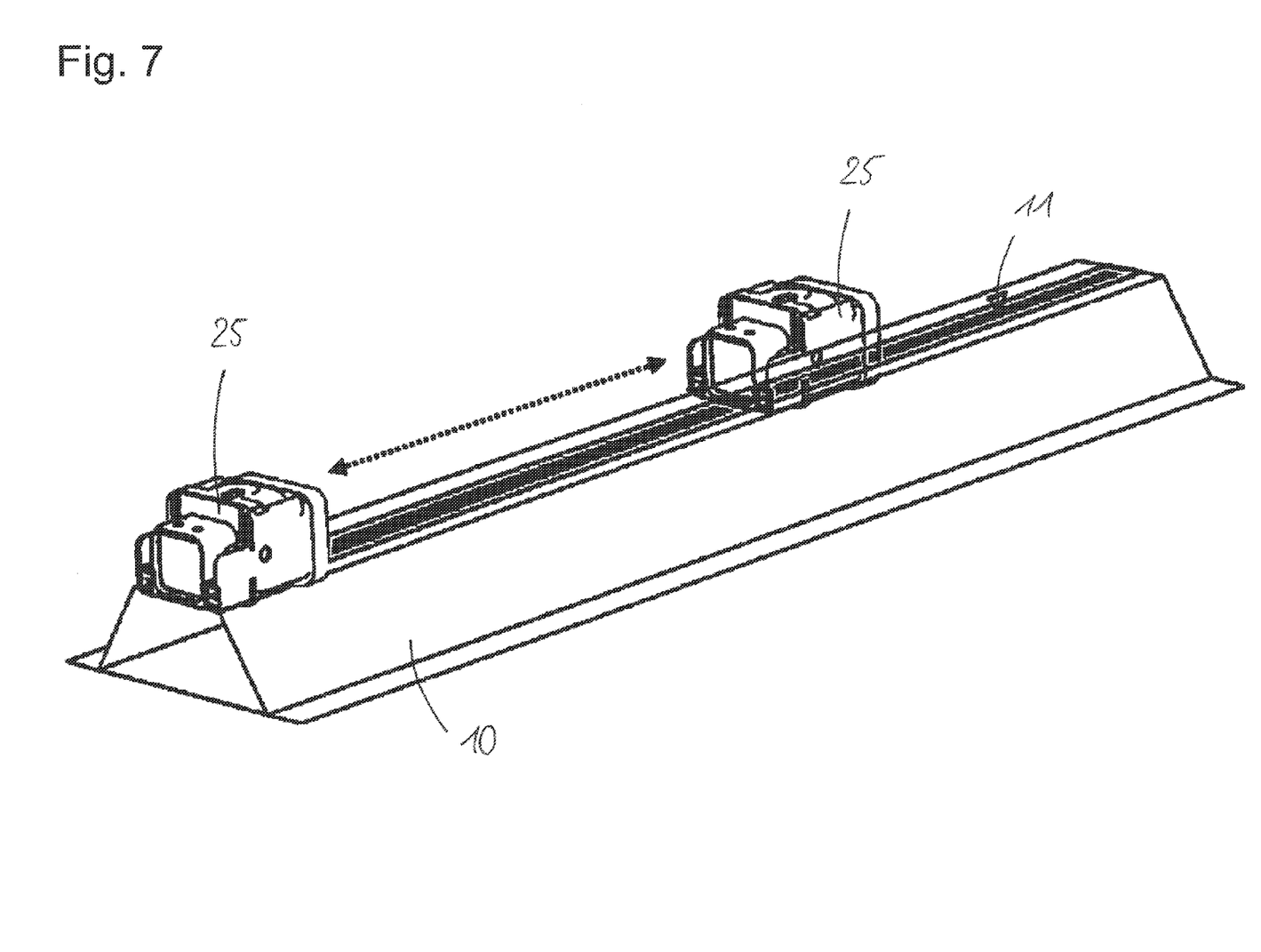
FIG. 7 shows access couplings for connection to the embedded lines.

FIG. 7 shows access couplings for connection to the embedded lines. Connecting system components, for example sensors, final control elements, air conditioning devices, entertainment devices, microprocessors, flight control systems, flight management systems etc., to the embedded lines preferably takes place by way of access couplings 25 in which the embedded optical fiber is tapped by means of an access hole, and the light guided by said optical fiber is deflected into the access coupling 25 by means of a microlens arrangement and is forwarded by the aforesaid. The access coupling 25 can then be connected to the system component by way of a flexible connecting element that is available in various lengths. Positioning this access coupling 25 is defined once the definition of the aircraft configuration has been determined, and once the positions have been defined at which various system components will be installed. This provides an advantage in that the connection position is flexible right up to this point in time. Since the optical fibers preferably extend along the entire length of the structural element, the access coupling 25 can be provided along the entire length of the structural element, although connection in the region of the points of intersection at which the structural elements 10, 12, 13 of various types intersect is most probable. However, it should be observed that in the case of embedded lines, positions for attaching the access coupling 25 are preferred, which positions have the least influence on the structural stability of the structural element 10, 12, 13 as a result of the holes being made. As an alternative to making holes it is also possible to implement the access coupling by means of an evanescent coupler.

Figure 8:
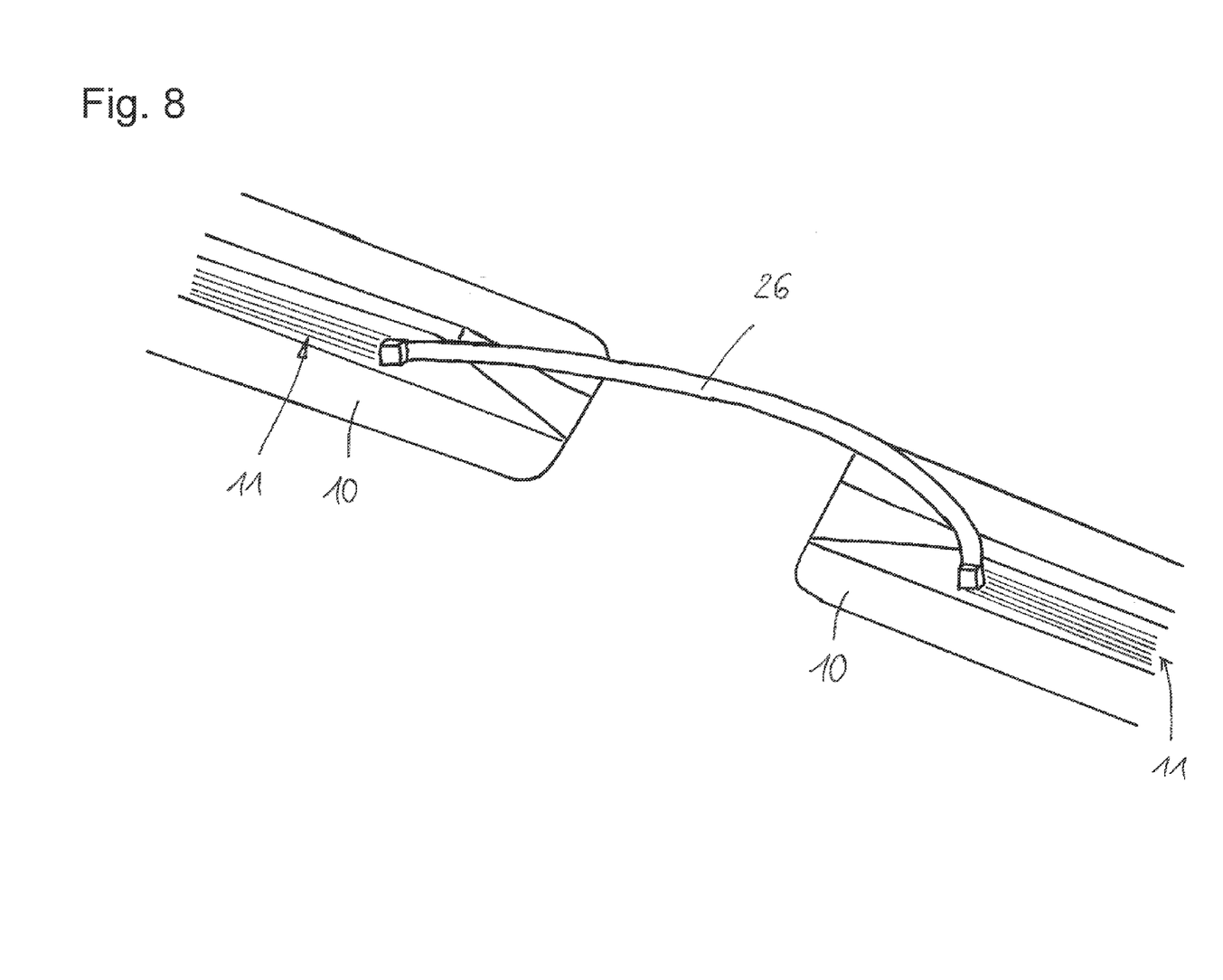
FIG. 8 shows the connection of aligned lines.

FIG. 8 shows the connection of aligned lines. Since the structural elements, for example longitudinal frame elements 10, transverse frame elements 12 and transverse braces 13, as a rule do not extend over the entire length or width or circumference of the aircraft fuselage, but instead several structural elements of the same type are interconnected on the face side, bridging of the multitude of lines 11, 14, 15 at these connecting points becomes necessary. In this arrangement the lines 11, 14, 15 preferably extend over 80 percent of the overall length of a structural element. More preferably they extend over 90 percent and still more preferably over the entire length of the structural element 10, 12, 13. The lines 11, 14, 15 on a structural element are connected by their respective ends to the aligned ends of the lines of the adjacent structural element of the same type (longitudinal frame element, transverse frame element, transverse brace) by means of connecting elements 26, so that for example in the case of the longitudinal frame elements 10 a line that extends along the entire length of the aircraft fuselage is formed along the longitudinal frame elements 10 that are arranged so as to be aligned with each other. In order to prevent possible transmission losses resulting from a multitude of connections in a particular route it is possible to provide optical amplification components along the lines, for example erbium-doped fiber amplifiers. Furthermore, it is possible to provide active amplifiers at the connection points described above.

It is also possible for the lines 11, 14, 15 not to extend along the entire length of the structural element, but instead, for the length to be determined according to the distance between points of intersection at which the structural elements of various types intersect. Preferably, the length of a line then amounts to 80 percent of this distance, more preferably 90 percent of the distance and still more preferably the entire distance. Determining the length according to this distance is, however, sensible only if this distance is considered to be definitive in relation to the remainder of the aircraft program.

It should be stressed that although the exemplary embodiments described above refer to longitudinal frame elements, transverse frame elements and transverse braces as primary structure elements, the primary structure elements that can be provided with the line network according to the invention are not limited to these. Other primary structure elements, such as parts of the outer skin, can be used to bear the lines. Furthermore, in an aircraft fuselage comprising a shell construction in which the exterior skin is the primary structural element, the lines can also be connected to this exterior skin.

Moreover, it should be emphasized that although in some exemplary embodiments only optical fibers have been mentioned, this exemplary embodiment correspondingly can, in addition or as an alternative, be implemented with electrical lines.

As an alternative or in addition to the above-described attachment or embedding of the lines 11, 14, 15 in primary structure elements such as longitudinal frame elements, transverse frame elements and transverse braces, the lines 11, 14, 15 can also be attached to or embedded in secondary structural elements, for example lining panels, floor panels, overhead storage bins (hatracks) etc. Generally speaking, the term "secondary structural elements" refers to those structural elements that do not support the primary load of the aircraft, and whose failure would thus not have a detrimental effect on the structural integrity of an aircraft cell.

In a further application the lines that span the aircraft structure act as sensors, for example as temperature sensors or as material stress sensors. Since the lines change their line characteristics according to external influences, by means of targeted evaluation this effect can correspondingly be used.

It should be pointed out those characteristics which have been described with reference to one of the above exemplary embodiments or to a design can also be used in combination with other characteristics of other exemplary embodiments described above.

What is claimed is:

1. An aircraft structure comprising:
   a primary structure including structural elements including longitudinal frame elements, transverse frame elements and transverse braces;
   a first multitude of lines in a fixed manner connected to the longitudinal frame elements and extending along the longitudinal frame elements;
   a second multitude of parallel lines in a fixed manner connected to the transverse frame elements, and extending along a circumference of the aircraft structure, with a longitudinal direction that intersects a longitudinal direction of the first multitude of lines so that longitudinal directions of the first multitude of lines and the second multitude of lines are configured to form a network that spans the aircraft structure in a plurality of sections;
   a third multitude of parallel, horizontal lines in a fixed manner connected to the transverse braces with a longitudinal direction that intersects a longitudinal direction of the first multitude of lines;
   connecting elements installed in the aircraft structure and configured to connect selected lines of the first multitude of lines to selected lines of the second multitude of lines at selected points of intersection of the network, and further configured to form transmission lines; and
   an access coupling that taps at least one line of the first multitude of lines to connect an aircraft system component to the at least one line of the first multitude of lines, wherein the access coupling is positionable along the entire length of one of the longitudinal frame elements to which the at least one line of the first multitude of lines is connected.

2. The aircraft structure of claim 1, wherein one of the longitudinal frame elements and one of the transverse frame elements comprise at least one bundle of at least twelve lines.

3. The aircraft structure of claim 1, wherein the first multitude of lines and the second multitude of lines are optical fiber lines.

4. The aircraft structure of claim 3, wherein the connecting elements are flexible and comprises an optical fiber line.

5. The aircraft structure of claim 1, wherein the first multitude of lines are attached to the longitudinal frame elements in at least some sections.

6. The aircraft structure of claim 1, wherein the first multitude of lines and the second multitude of lines are embedded in the respective one of the longitudinal frame elements and transverse frame elements in at least some sections.

7. The aircraft structure of claim 1, wherein the transmission lines are electricity transmission lines.

8. The aircraft structure of claim 1, wherein the transmission lines are data transmission lines.

9. The aircraft structure of claim 1, wherein at least one of the lines acts as a temperature sensor or a material stress sensor.

10. A method for manufacturing an aircraft structure, comprising:
   providing a primary structure comprising structural elements including longitudinal frame elements, transverse frame elements and transverse braces;
   providing an access coupling;
   connecting a first multitude of lines to the longitudinal frame elements in a fixed manner to extend along the longitudinal frame elements;
   connecting a second multitude of parallel lines to the transverse frame elements in a fixed manner so that a longitudinal direction of the second multitude of lines intersects with a longitudinal direction of the first multitude of lines, and the longitudinal direction of the first multitude of lines and the second multitude of lines are configured to form a network that spans the aircraft structure in at least some sections;
   connecting a third multitude of parallel, horizontal lines in a fixed manner to the transverse braces with a longitudinal direction that intersects a longitudinal direction of the first multitude of lines;
   installing the longitudinal frame elements and transverse frame elements in an aircraft such that the second multitude of parallel lines extends along a circumference of the aircraft structure, the first multitude of lines and the second multitude of lines forming a network that spans the aircraft structure in at least some sections; and
   connecting selected lines of the first multitude of lines to selected lines of the second multitude of lines at selected points of intersection of the network with connecting elements in order to form transmission lines;
   connecting an aircraft system component to at least one line from the first multitude of lines by tapping the at least one line of the first multitude of lines with the access coupling, the access coupling positionable at a multitude of positions along the entire length of one of the longitudinal frame elements to which the at least one line of the first multitude of lines is connected.

11. The method for manufacturing the aircraft structure of claim 10, wherein the first multitude of lines and the second multitude of lines are connected to the respective ones of the longitudinal frame elements and transverse frame elements in at least some sections and attached to respective ones of the longitudinal frame elements and transverse frame elements.

12. The method for manufacturing the aircraft structure of claim 10, wherein the first multitude of lines and the second multitude of lines are embedded in the respective ones of the longitudinal frame elements and transverse frame elements.

13. The method for manufacturing the aircraft structure of claim 10, wherein at a multitude of positions along the longitudinal direction of the first multitude of lines and the second multitude of lines, the connecting elements are connected to the first multitude of lines and the second multitude of lines with a material removal.

14. The method for manufacturing the aircraft structure of claim 10, wherein the transmission lines are electricity transmission lines.

15. The method for manufacturing the aircraft structure of claim 10, wherein the transmission lines are data transmissions.

* * * * *